T. J. DERY.
PRESSURE RETAINING DUST CAP FOR PNEUMATIC TIRE VALVES.
APPLICATION FILED APR. 25, 1921.

1,421,420. Patented July 4, 1922.

INVENTOR
THEODORE J. DERY.
BY Fetherstonhaugh
ATTYS.

UNITED STATES PATENT OFFICE.

THEODORE JOSEPH DERY, OF WINDSOR, ONTARIO, CANADA.

PRESSURE-RETAINING DUST CAP FOR PNEUMATIC-TIRE VALVES.

1,421,420.   Specification of Letters Patent.   Patented July 4, 1922.

Application filed April 25, 1921. Serial No. 464,273.

*To all whom it may concern:*

Be it known that I, THEODORE JOSEPH DERY, a subject of the King of Great Britain, and resident of the city of Windsor, in the Province of Ontario, Dominion of Canada, have invented certain new and useful Improvements in Pressure-Retaining Dust Caps for Pneumatic-Tire Valves, of which the following is a specification.

This invention relates to improvements in pressure retaining dust cap for pneumatic tire valves, and the objects of the invention are to provide simple and effective means for preventing escape or leakage of air from pneumatic tire valves.

Further objects are to enable the device to be constructed of few parts, all well adapted to perform the functions required of them, and it particularly provides a dust cap which may be readily attached or detached and which, when attached, will effectively seal the air against leakage.

And it consists essentially of the improved construction hereinafter described in detail in the acompanying specification and drawings.

In the drawings.

In the drawings like characters of reference indicate corresponding parts in all the figures.

Figure 1:
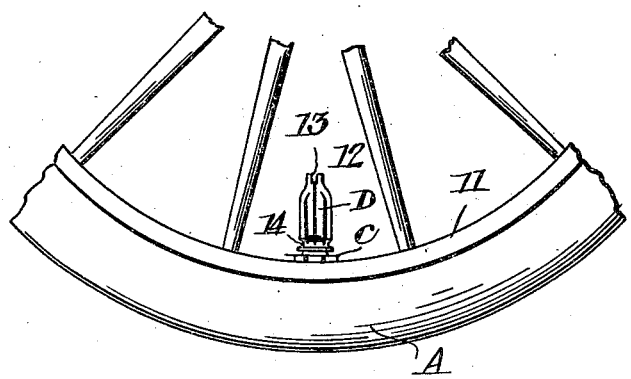
Figure 1 is a side elevation of a portion of a vehicle wheel with a pneumatic tire thereon having my improved pressure retaining cap.

Referring to the drawings:

A indicates a vehicle tire; B, the pneumatic air valve therefor which may be of any convenient or well-known structure and which includes a screw-threaded outlet tube 10. C indicates the retaining nut which engages the screw-threaded stem or valve and bears against the rim 11 of the vehicle wheel. D indicates a dust cap of tubular form crossed at the outer end, and, as shown, is octagonal in cross section.

The outer end of the valve cap D may be formed with an extension 12 having a socket or recess 13, which may be used to serve as a wrench for unscrewing the inside parts of the valve. The cap D is adapted to be retained in position by means of a spring retaining flange 14 formed at the lower end of the cap and curved inwardly and designed to engage a correspondingly curved flange 15 on the nut C, and to be held in spring engagement therewith by the spring in the metal of the cap D.

Figures 2, 3, 4, 5:
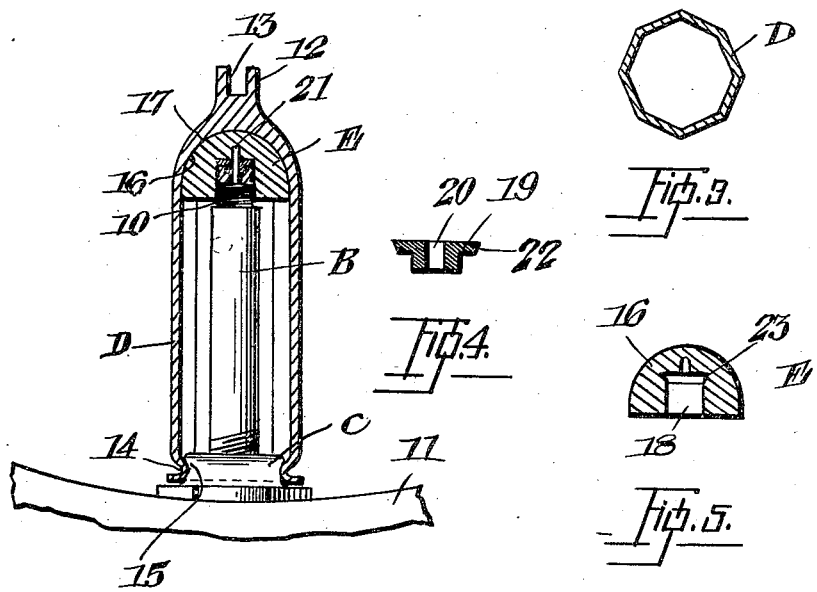
Figure 2 is a sectional elevation of the pressure retaining valve.
Figure 3 is a cross sectional view.
Figure 4 is a sectional detail of the gasket.
Figure 5 is a sectional detail through the air retaining member.

E indicates the air retaining member reciprocable within the cap D, and curved at its outer side 16 to correspond with the curvature of the inner end 17 of the cap D. This member is formed with a socket 18 adapted to fit over the end of the tube 10, the inner end of the socket carrying a gasket 19 (shaped as shown in Figure 4), the gasket being formed with a central perforation 20 through which the stem 21 of the valve may pass, and being formed with a bevelled edge 22 adapted to fit a correspondingly bevelled recess 23 formed in the member E.

The member E is adapted to slide freely within the cap D and be retained in parallel engagement by contact of its side and the sides of the cap. When the flanges 14 and 15 are in engagement, the member E will be in the position shown in Figure 2, and will hold the gasket 19 firmly in engagement with the edges of the sleeve 10 and thereby seal the same against the escape of air.

As many changes could be made in the above construction, and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. A device of the character described comprising a pneumatic air valve having a screw threaded outlet tube and a retaining nut, a dust cap of tubular form adapted to engage the retaining nut, an air retaining member engaging the sides of the cap on the inner side and adapted to fit the outer end of the cap being reciprocal within the said cap and formed with a socket adapted to fit over the end of the said tube and seal the same, the said retaining member having free sliding movement both with respect to the cap and with respect to the tube whereby it may freely slide over the screw threading on the tube.

2. A device of the character described comprising a pneumatic air valve having a screw threaded outlet tube and a retaining nut, a dust cap of tubular form adapted to engage the retaining nut, an air retaining member engaging the sides of the cap on the inner side and adapted to fit the outer end of the cap being reciprocal within the said cap and formed with a socket adapted to fit over the end of the said tube and seal the same, the said retaining member having free sliding movement both with respect to the cap and with respect to the tube whereby it may freely slide over the screw threading on the tube, and a gasket within the said socket.

3. A device of the character described comprising a dust cap having a curved inner end, an air valve having an outlet tube within the cap, an air retaining member fitting to the sides of the cap on the interior side and curved at its outer end to correspond with the curvature of the inner end of the cap and formed with a socket to fit over the end of the said tube, and means for preventing rotation of the air retaining member with respect to the tube.

In witness whereof I have hereunto set my hand in the presence of two witnesses.

THEODORE JOSEPH DERY.

Witnesses:
H. C. HEWITT,
M. J. HELMER.